United States Patent
Wu

(10) Patent No.: US 7,887,722 B1
(45) Date of Patent: Feb. 15, 2011

(54) METHOD FOR TRANSFERRING HOLOGRAPHIC AND OTHER MICROSTRUCTURE OR REFRACTIVE IMAGES ONTO A WEB-CARRIED RESIN COATING IN REGISTRATION WITH PRINTING ON THE WEB

(75) Inventor: Teh Ming Eric Wu, Shanghai (CN)

(73) Assignee: INX International Ink Co., Schaumburg, IL (US)

( * ) Notice: Subject to any disclaimer, the term of this patent is extended or adjusted under 35 U.S.C. 154(b) by 461 days.

(21) Appl. No.: 12/125,631

(22) Filed: May 22, 2008

(51) Int. Cl.
*B29D 11/00* (2006.01)

(52) U.S. Cl. ............... 264/1.34; 156/229; 264/1.38; 264/1.6; 264/1.7; 264/2.5; 264/2.7

(58) Field of Classification Search ............ 264/1.31, 264/1.34, 1.36, 1.38, 2.7, 2.5, 1.6, 1.7; 425/808; 156/229
See application file for complete search history.

(56) References Cited

U.S. PATENT DOCUMENTS

| | | |
|---|---|---|
| 3,427,778 A | 2/1969 | McCluskey |
| 3,658,526 A | 4/1972 | Haugh |
| 3,667,946 A | 6/1972 | Sturdevant |
| 3,758,649 A | 9/1973 | Frattarola |
| 3,850,633 A | 11/1974 | Moraw et al. |
| 4,329,409 A | 5/1982 | Wreede et al. |
| 4,657,780 A | 4/1987 | Pettigrew et al. |
| 4,758,296 A | 7/1988 | McGrew |
| 4,840,757 A | 6/1989 | Blenkhorn |
| 4,921,319 A | 5/1990 | Mallik |
| 4,933,120 A | 6/1990 | D'Amato et al. |
| 4,945,387 A | 7/1990 | Landa et al. |
| 4,971,646 A | 11/1990 | Schell et al. |
| 5,003,915 A | 4/1991 | D'Amato et al. |

(Continued)

FOREIGN PATENT DOCUMENTS

AU 199744607 B2 4/1998

(Continued)

*Primary Examiner*—Mathieu D. Vargot
(74) *Attorney, Agent, or Firm*—Drinker Biddle & Reath LLP

(57) ABSTRACT

The present invention includes preparing a carrier web with uniformly spaced images and corresponding registration marks at regular intervals, applying an energy curable resin coating to the carrier web either uniformly or in selected spots, providing a master web carrying uniformly spaced impressing images and corresponding registration marks at regular intervals where accurate alignment of the registration marks of the carrier web and the master web is achieved by stretching the master web to align the registration marks. The invention also comprises an apparatus including: (1) sensors which sense the location of the registration marks on the carrier web and the master web; (2) a computer programmed to monitor error signals representing the on-the-fly deviation in the alignment of the master and carrier web registration marks and makes determinations of the amount of stretching that must be applied to the master web in order to bring the registration marks into alignment; and (3) means for achieving the appropriate stretching of the master web to produce the desired alignment. In an alternative embodiment, a carrier web may also be prepared with a registered impressed image but a master drum will be used in lieu of the master web and the carrier web will be stretched as necessary to achieve image alignment.

19 Claims, 3 Drawing Sheets

U.S. PATENT DOCUMENTS

| | | | |
|---|---|---|---|
| 5,083,850 A | 1/1992 | Mallik et al. | |
| 5,116,548 A | 5/1992 | Mallik et al. | |
| 5,182,069 A | 1/1993 | Wick | |
| 5,270,097 A | 12/1993 | Amemiya et al. | |
| 5,279,689 A | 1/1994 | Shvartsman | |
| 5,281,499 A | 1/1994 | Bussard | |
| 5,486,254 A * | 1/1996 | Gallagher et al. | 156/229 |
| 5,519,516 A | 5/1996 | Wreede | |
| 5,558,740 A | 9/1996 | Bernard et al. | |
| 5,706,106 A | 1/1998 | Monaghan | |
| 5,800,907 A | 9/1998 | Yumoto | |
| 5,889,598 A | 3/1999 | Monaghan | |
| 6,181,446 B1 | 1/2001 | Cox et al. | |
| 6,214,443 B1 | 4/2001 | Palmasi et al. | |
| 6,372,073 B1 | 4/2002 | Weder | |
| 6,436,483 B2 | 8/2002 | Palmasi et al. | |
| 6,459,513 B1 | 10/2002 | Cox et al. | |
| 6,541,537 B1 | 4/2003 | Catena | |
| 6,549,309 B1 | 4/2003 | Monaghan et al. | |
| 6,613,481 B2 | 9/2003 | Hamada | |
| 6,649,312 B1 | 11/2003 | Chari et al. | |
| 6,775,036 B2 | 8/2004 | Cox et al. | |
| 6,816,312 B2 | 11/2004 | Oda et al. | |
| 6,824,638 B1 | 11/2004 | Anderson et al. | |
| 6,835,948 B2 | 12/2004 | Woontner | |
| 6,957,160 B2 | 10/2005 | Miller et al. | |
| 6,998,196 B2 | 2/2006 | Rich et al. | |
| 7,032,518 B2 | 4/2006 | Scheffer et al. | |
| 2002/0179231 A1 | 12/2002 | Weder | |
| 2003/0054103 A1 | 3/2003 | Sato et al. | |
| 2003/0108710 A1 | 6/2003 | Coyle et al. | |
| 2003/0112523 A1 | 6/2003 | Daniell | |
| 2003/0124436 A1 | 7/2003 | Shioda et al. | |
| 2003/0227099 A1 | 12/2003 | Makansi | |
| 2004/0188871 A1 | 9/2004 | Shiao et al. | |
| 2004/0218238 A1 | 11/2004 | Xie et al. | |
| 2004/0235979 A1 | 11/2004 | Miezeiwski et al. | |
| 2004/0241404 A1 | 12/2004 | Shiao | |
| 2005/0012970 A1 | 1/2005 | Cox et al. | |
| 2005/0052714 A1 | 3/2005 | Klug et al. | |
| 2005/0068596 A1 | 3/2005 | Claudelli et al. | |
| 2005/0082697 A1 | 4/2005 | Shiao et al. | |
| 2005/0179253 A1 | 8/2005 | Rivera et al. | |
| 2006/0056033 A1 | 3/2006 | Rosenthal | |
| 2006/0121358 A1 | 6/2006 | Rich et al. | |
| 2006/0275625 A1 | 12/2006 | Lieberman | |
| 2006/0285215 A1 | 12/2006 | Wu | |

FOREIGN PATENT DOCUMENTS

| | | |
|---|---|---|
| CN | 1276332 A | 12/2000 |
| CN | 1586900 A | 3/2005 |
| CN | 200510026583.6 | 6/2005 |
| EP | 0 893 223 A1 | 1/1999 |
| EP | 1 844 921 A1 | 10/2007 |
| ES | 2 145 658 | 7/2000 |
| JP | 05-303153 | 11/1993 |
| JP | 2006-181554 | 7/2006 |
| WO | WO 95/09372 | 4/1995 |
| WO | WO 00/30854 A1 | 6/2000 |
| WO | WO 2005/035236 A1 | 4/2005 |
| WO | WO 2006/070791 A1 | 7/2006 |

* cited by examiner

METHOD FOR TRANSFERRING HOLOGRAPHIC AND OTHER MICROSTRUCTURE OR REFRACTIVE IMAGES ONTO A WEB-CARRIED RESIN COATING IN REGISTRATION WITH PRINTING ON THE WEB

FIELD OF THE INVENTION

This invention relates generally to forming holographic and other microstructure or refractive images in a web-carried resin coating and, more particularly, to a method of impressing such microstructure images from a master web or a drum into a resin coating on a carrier web in a pre-determined registration with one or more printed images on the carrier web in a rapid, efficient and consistently accurate way.

BACKGROUND OF THE INVENTION

Holographic and other microstructure or refractive images are applied to printed material to capture the visual attention of the viewer by producing elaborate visual effects via light refraction and reflection. Such applied imagery can produce different viewing effects depending on the viewing angle, light source, and image details. Additionally, since holographic and other microstructure imagery is difficult to manipulate, copy or reproduce, holograms and other microstructure or refractive images applied in a pre-determined registration with printing on a substrate are particularly useful for security purposes.

Conventional systems for creating holograms or other cast images in registration with printing on a substrate use, inter alia, drums and can produce problematic repeat lines in a resin layer in the final product corresponding to seams between adjacent relief image masters mounted on the drums. For example, electroformed metal masters may be welded together or plastic masters may be ultrasonically butt-welded, or a number of masters may be adhered to the surface of the drum with the impressing surfaces of the masters facing out. In each case seams are present which can be impressed onto the receiving substrate along with the intended imagery.

Current systems for applying holographic and other microstructure images using heating also have important drawbacks. For example, applying holograms to rigid resin substrates with a heated drum to form microstructure images in a hardened resin substrate can produce image distortion due to the substantial heat and pressure required to impress the image into the rigid substrate. Similarly, applying further heating to previously heat-impressed films, such as the heat necessary to apply shrink film webs with microstructure images to container surfaces, can distort the images, effectively causing them to disappear or to lose some of their holographic or other refractive properties.

Systems for impressing holographic and other microstructure or refractive images into a layer of curable liquid resin using drums with adjacent relief image masters (as described above) and then curing are also known. These systems suffer shortcomings in addition to those stemming from the seams between adjacent masters on the drum. For example, it is difficult to maintain accurate registration between the impressing image on the drum and printing on the substrate carrying the curable liquid resin. This problem is exacerbated when the system is run at high speed. Indeed, current systems for impressing holographic and other microstructure or refractive images into a layer of curable liquid resin using drums with adjacent relief image masters offer no means for fine tuning the alignment between the impressing image on the drum and printing on the substrate carrying the curable liquid resin.

Thus, systems for creating holographic and other microstructure or refractive images in registration with printing on a substrate, which optionally eliminate repeat lines, which reduce image distortion and which provide holographic images that stand up to subsequent heating would represent important contributions to the art. Furthermore, if such systems were made available that achieved highly accurate registration at high speed, that accommodated large images, or that eliminated the down time associated with constant re-application of the same drum-mounted impressing images particularly, significant contributions to the art would be at hand.

SUMMARY OF THE INVENTION

The present invention constitutes such an advance in the art. In one embodiment it employs a master web that can be any length desired, with repeating impressing images regularly spaced along the web. Alternatively, the web may be a continuous loop, again with repeating impressing images regularly spaced along the web loop. In order to transfer the images from the master web at an impressing station, the surface of the web carrying the impressing images is nipped against the surface of a carrier web carrying printing overlaid with an energy curable resin coating that is either continuous across the web or selectively spot coated. After the impressed image is applied to the curable resin coating at this impressing station in registration with the printing on the carrier web, the resin is cured and the final product is collected and used as desired.

This resin-impressing system may be used in-line with conventional printing systems that apply printing to the carrier web ahead of the resin application and impressing steps. Alternatively, printing may be applied after the resin application/impressing steps, or both before and after the resin application/impressing steps. Also, the resin application/impressing system may be used in a stand alone fashion where printing is applied to the carrier web in a separate discrete step at a remote location. Additionally, printing may be applied to one or both sides of the carrier web, including optionally overprinting the resin coating after it is cured. Indeed, in certain security applications a removable coating may be laid down over the resin coating in such an overprinting step to hide the microstructure image until access is required to establish the bona fides of the document by scraping away the removable coating to reveal the microstructure image.

In yet another embodiment of the invention, the master web may itself be laminated to the carrier web after registration is achieved in accordance with the present invention. This may be done using a laminating station operating in-line following the application of printing to the carrier web or it may be done in a post-printing step separate from the printing operation. Typically, the master web will be oriented with the impressing image directed away from the carrier and the carrier surface or the back of the master web will be coated with a laminating medium before adhering the master web in a conventional laminating process.

The master web and the carrier webs are provided with registration marks that are aligned in accordance with the invention before the impressing image is nipped to the resin coating to ensure accurate registration between the impressed image in the resin coating and the printing on the carrier web. The registration marks may be any type of mark that is detectable by the scanner device used such as printed rectangles or other geometric shapes, cross hairs, bullseyes, etc.

The present invention accomplishes registration using unique iterative steps in which the images on the master web are spaced apart or have a "repeat" distance slightly less than the intended spacing (or "repeat") of the impressed images in coordination with the printed images on the carrier web so that the master web can be stretched on-the-fly, in increments or by varying amounts, to establish and then to maintain continuous registration of the impressed image and the printing on the carrier web. The on-the-fly stretching process relies on sensing the arrival of registration marks on the master web at a predetermined master sensor location chosen to correlate with the arrival of the registration marks on the carrier web at another predetermined carrier sensor location where simultaneous arrival of the registration marks of the master and carrier webs at these predetermined locations indicates proper registration of the impressed images and the printed images on the carrier web. Thus, when the registration marks on the master web arrive at the master sensor before the registration marks on the carrier web arrive at the carrier sensor, correction by on-the-fly variable stretching of the master web is carried out as described below. When there is no such image dislocation, no correction is applied. Also, since the practical stretching range of the master web is limited and varies depending on the material and thickness of the master web, where the image dislocation exceeds the practical stretching range of the master web, the image alignment typically will proceed in successive or iterative stretching steps until full alignment is achieved.

This on-the-fly variable stretching is accomplished by running the master web through at least two powered nip stations where the downstream nip station (the nearest to the impressing station) has a line speed corresponding to the line speed of the carrier web through the impressing station and the line speed of the upstream nip station is decreased as necessary causing the master web to stretch between the two nip stations until the registration marks on the master and carrier webs arrive at the nip point of the impression station simultaneously. The master and carrier registration mark arrivals are monitored by sensors at these locations that send the register mark data to a computer program to control the line speed of the upstream nip pair as appropriate to achieve the necessary stretching of the master web. The stretching of the master web is thus continuously adjusted by the computer which receives and processes an error signal indicative of the extent to which the registration marks on the master and carrier webs are out of alignment. This process may be facilitated by generally "pre-aligning" the images before start up so that the number of iterations of correction can be minimized.

Image registration may also be achieved where the master web is replaced by a conventional master drum by employing on-the-fly stretching techniques similar to those described above. In this embodiment of the invention, one or more master drum registration marks can be used in conjunction with corresponding registration marks on a carrier web for monitoring registration error or image dislocation between the impressing images on the drum and the printed images on the carrier web. Alternatively, a reference angle may be established in the rotation of the master drum using, e.g., known servo motor apparatus and techniques, and the desired registered relationship between this reference angle and the carrier web registration marks monitored, established and maintained. In these embodiments, however, stretching is applied to the carrier web using the stretching technique described in the previous embodiment with respect to the master web to achieve an on-the-fly continuous registration between the impressed image and the printing on the carrier web.

Thus, as outlined above, the present invention includes preparing a carrier web with uniformly spaced images registration marks at regular intervals. An energy curable resin coating will be applied to the carrier web either uniformly or in selected spots ("spot coating"). Spot coating is preferred for shrink film carrier webs where the amount of curable resin coating is to be minimized since large amounts or broadly applied resin can produce distortions in the film when it is later shrunk, e.g., onto a container. A master web carrying a uniformly spaced impressing image and registration marks at regular intervals is supplied. The master web will typically be provided on a supply roll although it also may be in the form of a continuous belt. Where the master web is in the preferred form of a supply roll, it may be wound up and reused so long as the impression images hold up after impressing the energy curable resin and appropriate curing energy is supplied to cure or harden the energy curable resin coating and the master is separated from the carrier web to leave a cast resin image on the carrier web.

Finally, rapidly achieved and maintained accurate alignment of the registration marks of the carrier web and the master web is essential to the practice of the present invention. This is achieved by an apparatus including: (1) sensors which sense the location of the registration marks on the carrier web and the master web; (2) a computer programmed to monitor error signals representing the on-the-fly deviation in the alignment of the master and carrier web registration marks and makes determinations of the amount of stretching that must be applied to the master web in order to bring the registration marks into alignment, and (3) means for achieving the appropriate stretching to produce the desired alignment. Also, the stretching is generally accomplished in increments that do not exceed the maximum acceptable stretching limits of the carrier film being used. For example, for a polyester film [???], the stretch limit would be up to about 1% whereas for an oriented polypropylene master web, the stretch limit would be up to about 1.5-3%.

In an alternative embodiment of the present invention, a carrier web may also be prepared with a registered impressed image comprising a carrier web but a master web will not be used. Rather, a master drum will be provided carrying an impressing image along its outer surface and registration marks on the periphery of the master drum. Then, an energy curable resin coating is applied to the carrier web and the registration mark of the cannier web and the registration marks of the master drum are aligned as described above. The energy curable resin coating is disposed between the carrier web and the circumferential surface of the master drum and curing energy is applied to the energy curable resin coating while the coating remains in contact with the impressing image to produce a final hardened image whereupon the finished carrier web with its cured resin coating bearing the impressed image is collected as appropriate.

The carrier and master webs can be any appropriate sufficiently flexible material. Preferably, the carrier web will have a thickness in the range of about 10-600 mil. For example, the carrier web may be heat shrinkable film, polyethylene terephthalate, polypropylene, oriented polypropylene, polyvinyl chloride, polystyrene, amorphous polyethylene terephthalate, polyethylene, paper, metal foil, coiled metal. In a preferred embodiment the carrier web will be a heat shrinkable film. Appropriate heat shrinkable films include oriented polystyrene, glycol-modified polyethylene terephthalate, and polyvinyl chloride. For such heat shrinkable films, the film thickness will generally be in the range of about 30-80 microns.

The impressing image may be chosen to produce impressed images including, for example, holographic, varying texture images (e.g., matte film), stereograms, light-defracting devices, optical lenses, and lenticular surfaces. Among these, holographic embossing images are currently preferred in the practice of this invention.

The energy curable resin coating may be any known flowable liquid resin that can be rapidly cured by the application of actinic radiation or otherwise. For example, UV curable flowable liquid resins may be used or resins curable with electron beam radiation may be used. Examples of UV curable resins include UV curable overprint varnishes, free radical and cationic curable resin coatings, and UV curable lithographic inks.

In a preferred embodiment of the invention, the energy curable resin coating will be curable with actinic radiation and the master web will be transparent or translucent to permit the actinic radiation to pass therethrough to cure the energy curable resin coating.

DETAILED DESCRIPTION OF THE INVENTION

Figure 1:
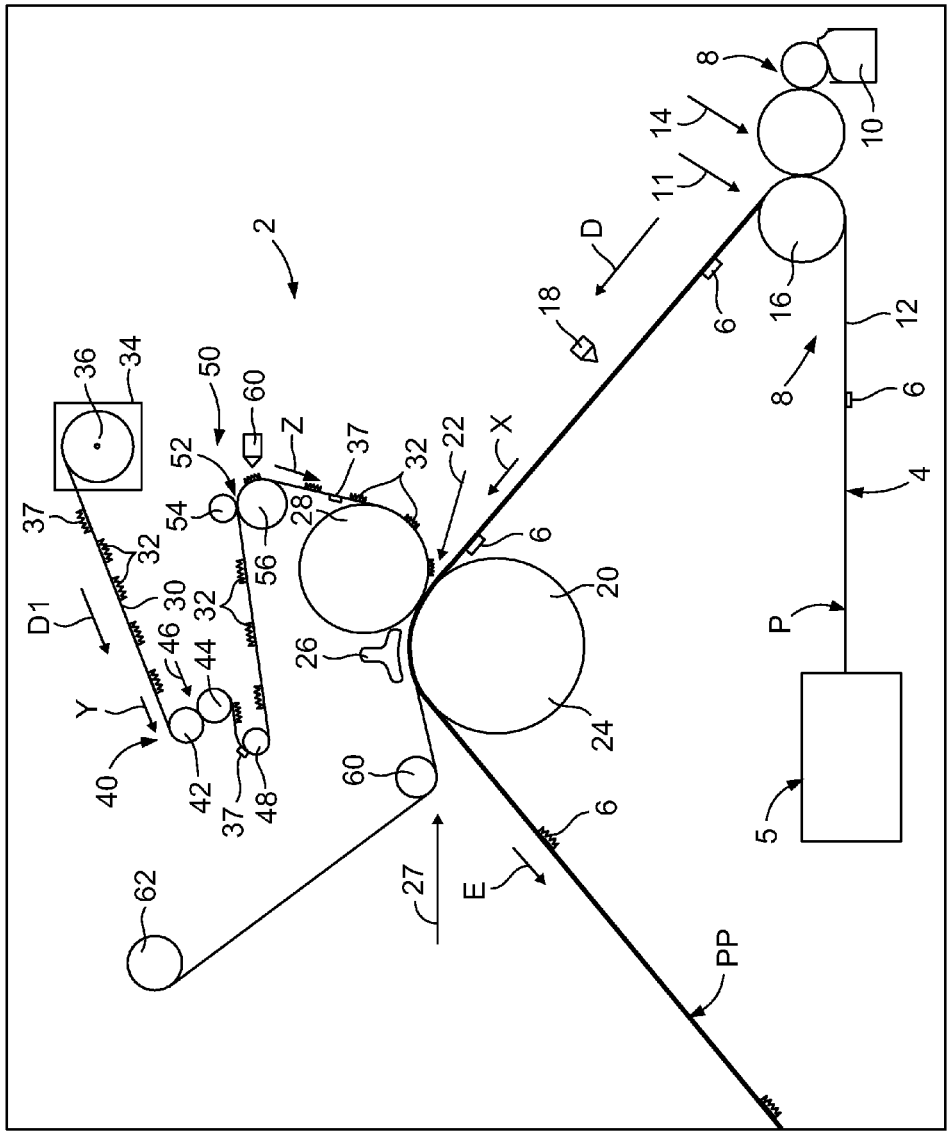
FIG. 1 is a diagramatic representation of a system in accordance with the present invention in which registration between printed images on a carrier web and impressed holographic and other microstructure or refractive images also on the carrier web is achieved by variably stretching the master web.

Turning now to FIG. 1, an apparatus 2 for transferring holographic and other microstructure or refractive images onto a web-carried resin coating in registration with printing on the carrier web impressed is illustrated. The carrier web 4 may be any web-like material which is capable of being passed through a printing press-type apparatus. For example, the carrier web may be PET, polypropylene, oriented polypropylene, PVC, polystyrene, APET, polyethylene, coated and uncoated papers, foils, thin metal or coil, etc. One particularly desirable carrier web is heat-shrinkable film. Carrier web 4 in the illustrated embodiment is oriented polystyrene suitable for shrink wrap applications and includes carrier registration marks 6 which are printed onto the web (and would not be thick enough to be apparent in the view of FIG. 1 but have been enlarged here in order to make them visible).

Carrier web 4 is supplied from a carrier web delivery station 5 having an appropriate unwind mechanism (not shown) and is advanced through a resin coating station 8 containing flowable curable resin 10. A coating 11 of the resin is thus coated onto surface 12 of the web using an appropriate coating apparatus and process. The carrier web is passed between a back up roller 14 and a coating cylinder 16 to apply coating 11 to a predetermined thickness and to establish a generally smooth surfaced, even coating. The resin coating station may be of any conventional design and may use, for example, gravure, flexographic, lithographic or silk screen techniques to apply the coating of flowable resin.

Coating 11 may be any known flowable liquid resin that is rapidly curable by the application of actinic radiation, including particularly UV radiation, electron beam radiation, and LED light. When LED light is used it will typically be of a wavelength in the range of 365 to 395 nm. Examples of classes of suitable energy curable flowable liquid coatings include UV curable overprint varnishes, free radical and cationic curable resin coatings, curable lithographic inks, etc. Suitable commercially available energy curable resin coatings in these classes are available, for example, from INX International, 150 North Martingale, Schaumburg, Ill. 60173, under the trademarks and product designations PROCURE™ 2009, PROCURE™ 5000, PROCURE™ UV 8005, PROCURE™ UV 1037, PROCURE™ UV 3000, PROCURE™ 5075, PROCURE™ UV 5701, INXFLEX™ Series 2000, INXFLEX™ Series 1000, INXFLEX™ ITX-Free, INXCURE™, UVEXCEL™ INXCURE™ Fusion Hybrid, INXScreen™ UV HP, and INXCURE™ UV Letter Press 1216594.

Carrier web 4 carrying resin coating 11 is drawn in direction D past a carrier sensor 18 toward an impression drum 20 where it passes through a first nip point 22 located between the outer surface 24 of a powered impression drum 20 and a first nip roller 28. (Alternatively, nip roller 28 may be powered). The resin coating is impressed by impression images 32 of master web 30 at this point, as will be explained below, as the carrier web advances at a pre-determined line speed "x". As the resin-coated carrier web moves along surface 24 of the impression drum following nip point 22, it passes under a radiation source 26 which will supply the radiation required to cure the resin coating through the master web to fix the microstructure images impressed in the surface of the resin coating, as also explained below. Thus, where resin coating 11 is a UV curable resin coating, master web 30 will be clear or translucent and radiation source 26 will comprise one or more UV lamps of a power sufficient to cure the resin coating as the carrier web moves rapidly past the lamp(s). Preferably the UV lamp(s) are located in a protective housing positioned close to the periphery of drum 20. After the carrier web carrying the cured resin coating exits the area below the radiation source, it moves in direction E where it is collected on a collection roller (not shown) or further processed as desired.

Figure 2:
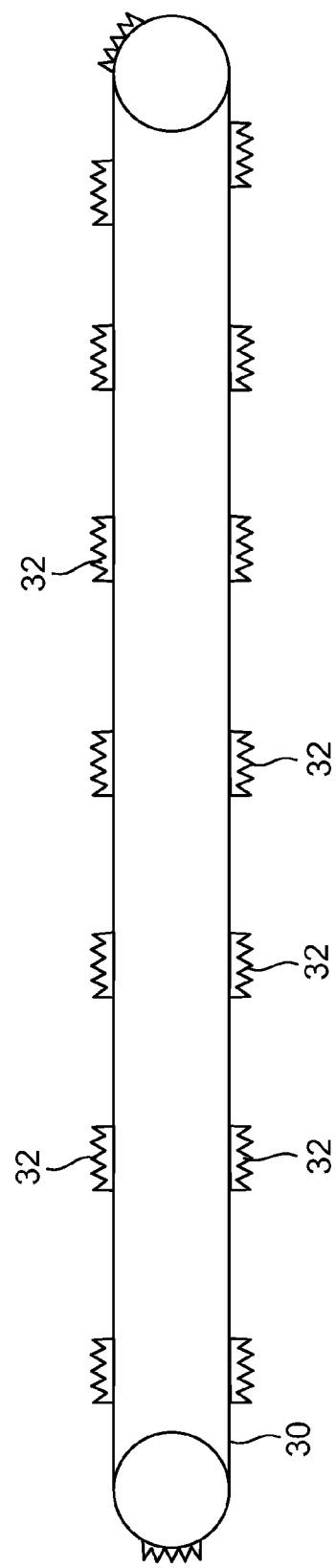
FIG. 2 is a diagramatic representation of a portion of a continuous loop master web which could be used in lieu of the master web shown in FIG. 1 showing successive impressing images on the looped master web.

Apparatus 2 is also supplied with a master web 30 carrying a pre-formed microstructure image comprising, e.g., a uniformly spaced series of surface relief hologram impression images 32 or other relief light diffraction impression images. These impression images may include, for example, holographic images, varying texture images (e.g., matte film), stereograms, light-defracting devices, optical lenses, and lenticular surfaces. The master web will typically be supplied from a master web unwind station 34 which includes a supply roll 36 as illustrated in FIG. 1, although alternatively it may be in a continuous belt form as shown in FIG. 2. The master web will include a series of master registration marks 37, which, like carrier registration marks 6, are enlarged to improve their visibility.

The master web will move in direction D1 into a powered nip roller set 40 comprising rollers 42 and 44 which meet at a nip point 46 through which master web 30 is advanced at a first master line speed "y" which will be less than or equal to the carrier line speed "x". The master web next enters and moves over an optional guide roller 48 and onto a second powered nip roller set 50 which meet at a nip point 52 between roller 54 and 56 through which the master web 30 is next advanced at speed "x" which is equal to the carrier line speed. Rollers 54 and 56 are powered and rotate at a controllable variable velocity to cooperate with rollers 42 and 44 in producing the desired degree of stretch in the master web, as explained below.

A master sensor 60 is positioned opposite roller 56. This sensor is designed to determine when master registration marks 32 pass this location. The registration marks may be illuminated and imaged through an optical path and the image information from the detected beam continuously processed using a computer which generates an error signal dependent upon the displacement of master registration marks vis-à-vis the carrier registration marks. Additionally, edge scanners (not shown) can be used to ensure proper tracking of the master and carrier webs.

Master web 30 then passes into the impressing station 27 over nip roller 28 and through nip location 22. The master web is thus nipped to the coated carrier web to impress microstructure images 32 of the master web into the surface of the energy curable resin coating on the carrier web. The resin and its impressed image are then cured to fix the image in radiation station 26 and the final product collected on a roller or other appropriate storage structure (not shown). The carrier web and impressed images may be metallized in a separate step using known techniques (e.g., vacuum metalizing) to protect the image and/or to enhance its reflectivity. After the master web passes moves past the radiation station, it travels over a take-over roller 60 to a guided roll 62.

Carrier web 4 may be pre-printed with an image designed to receive the microstructure image in a desired registration with the pre-printed image and corresponding registration mark 6. Alternatively, printing may be applied in-line ahead of liquid resin coating station 8, for example at point P. Indeed, it is also within the teaching of the invention to apply printing to the carrier web after it leaves drum 20, for example at point PP. In the latter case, it is preferred that the carrier web be transparent or translucent and the printed image be applied to the carrier web surface either opposite or on the same side as the resin coated surface or the printing may be applied on both sides of the carrier web. The printing applied at point P or at point PP will use conventional printing techniques such as flexographic, gravure, offset, screen, letterpress, inkjet, or indigo.

Images 32 on the master web are spaced at a repeat distance less than the intended repeat distance of the impressed images on the carrier web (corresponding to the similarly repeating printed images on the carrier web) so that the master web can stretched as necessary to place the impressed images onto the carrier web in the proper alignment. The master web is stretched on-the-fly, in increments or by varying amounts, to establish and then to maintain continuous registration of the impressed image and the printing on the carrier web.

The on-the-fly stretching process relies on sensing the arrival of the registration marks on the master web associated with the impressing images at sensor 60 which correlates with the arrival of the registration marks on the carrier web at sensor 18 where simultaneous arrival of the registration marks of the master and carrier webs at these predetermined locations indicates proper registration of the impressed images and the printed images on the carrier web. Thus, when the registration marks on the master web arrive at the master sensor before the registration marks on the carrier web arrive at the carrier sensor correction by on-the-fly variable stretching of the master web is carried out. This on-the-fly variable stretching is accomplished by running the master web through powered nip stations 40 and 50 where downstream station 20 runs at the line speed of the carrier web and the line speed of the upstream nip station is decreased as necessary to stretch the master web between the two nip stations until the registration marks on the master and carrier webs arrive at their predetermined master and carrier sensor locations simultaneously.

The data regarding arrival of the registration marks at sensors 18 and 60 is sent to a computer which is programmed using known techniques to control the line speed of the upstream nip pair as appropriate to achieve the necessary stretching of the master carrier. The stretching of the master web is thus continuously adjusted by the computer which receives and processes an error signal indicative of the extent to which the registration marks on the master and carrier webs are out of alignment. Finally, dancer rolls can optionally be used in the present invention in order to take up any slack in the master or carrier webs, but could not be used to achieve this stretching/alignment objective.

Figure 3:
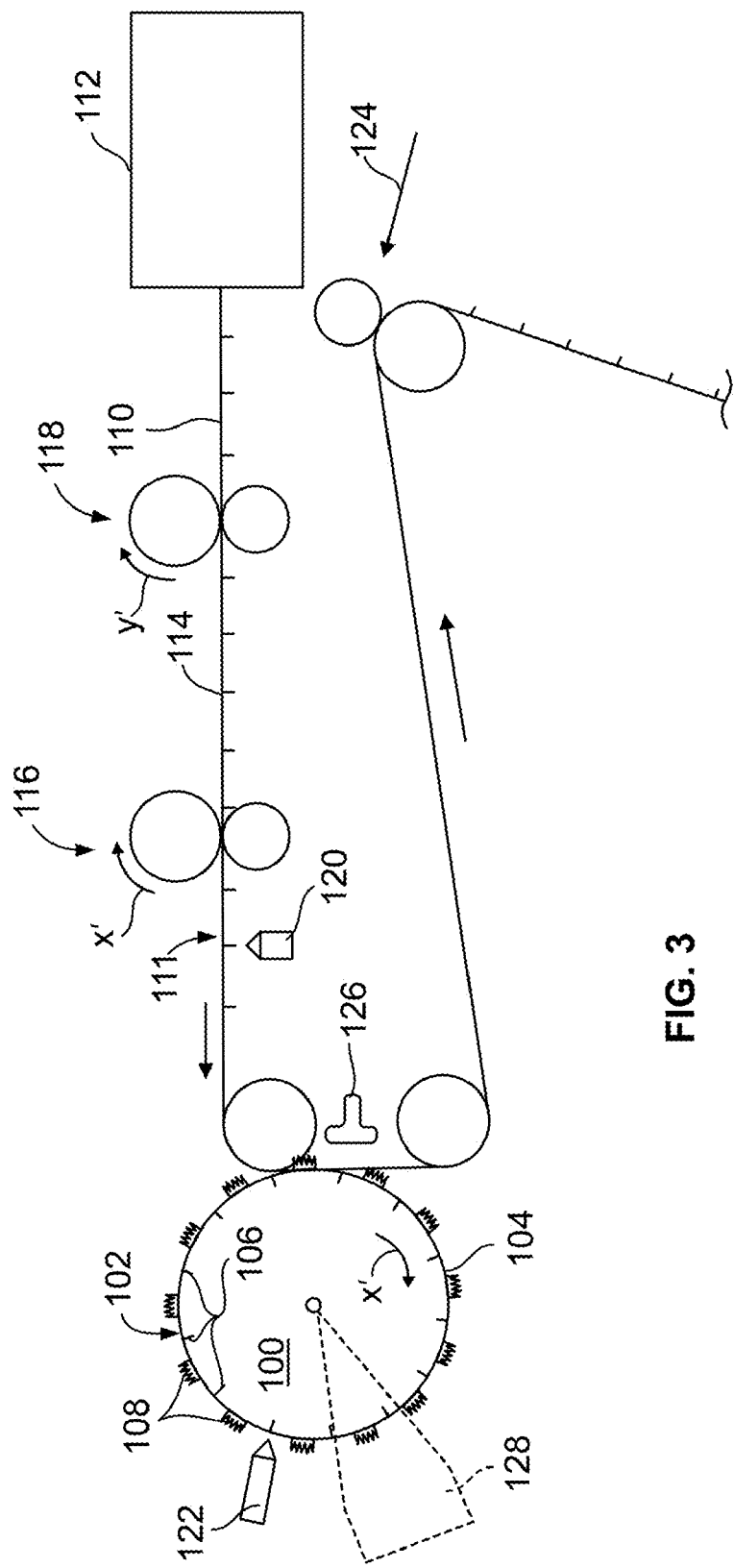
FIG. 3 is a diagramatic representation of an alternate embodiment of the present invention in which registration between printed images on a carrier web and impression images on a master drum is achieved by variably stretching the carrier web on-the-fly.

FIG. 3 illustrates an alternative embodiment of the invention utilizing a master drum 100 in lieu of the master web of the previous embodiment. The master drum has a relief master 102 mounted to its outer surface 104 by conventional means with a series of impression images 108 for impressing microstructure images into a resin coating on a carrier web, as explained below. A series of register marks 106 are positioned along the periphery of the drum.

A stretchable carrier web 110 is supplied from a delivery station 112. Conventional means (not shown) apply a curable resin coating 111 to the top surface 114 of the carrier web following nip station 116. The material of the carrier web will be chosen from the materials described in connection with previous embodiment of the invention. Similarly, coating 111 will also be any known flowable liquid resin that can be rapidly cured by the application of actinic radiation, also as described in connection with the previous embodiment.

Carrier web 110 passes through a pair of powered nip stations 116 and 118. The speed of rotation of the master drum 100 and of the rollers of nip station 116 is the same, and designated "x'" in FIG. 3. Nip station 118, however, will rotate at a velocity equal to or less than x' in order to stretch the carrier web as needed to achieve registration between printing on the web and the impressed images laid into the curable resin layer. Therefore, the repeat in the printed images of the carrier web will be closer than the repeat in the impressing images on the drum to provide leeway for stretching. Velocity y' is controlled as in the previous embodiment by way of signals fed from carrier web sensor 120 and master drum sensor 122 to a computer programmed to vary velocity y' as necessary to stretch the carrier web and achieve the desired alignment.

The continuous movement of the carrier web is ensured by powered rolls in a third powered nip station 124. Also, actinic radiation is provided by light unit 126 following the impression of the images into the resin layer.

In yet another alternative embodiment of the invention, instead of monitoring registration marks 106 on the master drum, the angle of rotation of the master drum may be monitored using a servo motor apparatus 128 which senses the angular displacement of the master drum as it rotates and supplies that data to a computer. The computer uses this data in conjunction with the output of carrier sensor 120 to determine when the impressed images are in the proper registration, to vary rotation speed y' as necessary to stretch the carrier web to the extent necessary to achieve and maintain the registration. The spacing between the nip roller stations may be varied as desired.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of preparing a carrier web having printed images spaced at a first repeat distance with impressed images in registration with the printed images comprising:
providing a carrier web with printed images spaced at a first repeat distance and corresponding registration marks;
providing a master web with impressing images at a second repeat distance and corresponding registration marks where the second repeat distance is less than the first repeat distance;
applying an energy curable resin coating over the printing on the carrier web;
stretching the master web to align the registration marks of the carrier web and the master web;
nipping the master web to the coated carrier web at a nip location point to thereby impress images on the coated carrier web in registration with the printed images;
applying curing energy; and
separating the master from the carrier web to leave an impressed image on the carrier web in registration with the printed images on the carrier web.

2. The method of claim 1 in which the carrier web is chosen from the group consisting of heat shrinkable film, polyethylene terephthalate, polypropylene, oriented polypropylene, polyvinyl chloride, polystyrene, amorphous polyethylene terephthalate, polyethylene, paper, metal foil, and coiled metal.

3. The method of claim 1 in which the carrier web is a heat shrinkable film.

4. The method of claim 3 in which the heat shrinkable film is chosen from the group consisting of oriented polystyrene, glycol-modified polyethylene terephthalate, and polyvinyl chloride.

5. The method of claim 1 in which the impressing image is chosen from the group consisting of holographic, varying texture images, stereograms, light-diffracting devices, optical lenses, and lenticular surfaces.

6. The method of claim 1 in which the impressing image is a holographic image.

7. The method of claim 1 in which energy curable resin is spot coated onto the carrier web to receive the impressed images.

8. The method of claim 1 in which the energy curable resin coating on the carrier web is curable with actinic radiation and the master web is transparent or translucent to permit the actinic radiation to pass therethrough to cure the energy curable resin coating.

9. The method of claim 1 in which further printing is applied inline over the resin coating after it is cured.

10. The method of claim 1 in which a removable coating is laid down over the cured resin coating to hide the impressed images.

11. The method of claim 1 in which at least the impressed image side of the carrier web is metallized.

12. The method of claim 1 in which the master web is a continuous loop.

13. A method of preparing a carrier web having printed images spaced at a first repeat distance with impressed images in registration with the printed images comprising:
providing a carrier web with printed images spaced at a first repeat distance and corresponding registration marks;
providing a master drum carrying an impressing image on its outer surface;
establishing at least one registration location on the master drum;
applying an energy curable resin coating to the carrier web;
aligning the registration marks of the carrier web and the registration mark of the master drum as the carrier web moves past the master drum with the energy curable resin coating nipped between the carrier web and the surface of the master drum by stretching the carrier web as needed to thereby impress images on the coated carrier web in registration with the printed images;
applying curing energy to the energy curable resin coating while the resin coating remains in contact with the impressing image; and
collecting a finished carrier web with a cured coating bearing the impressed image.

14. The method of claim 13 in which the carrier web is chosen from the group consisting of heat shrinkable film, polyethylene terephthalate, polyester, polypropylene, oriented polypropylene, polyvinyl chloride, polystyrene, amorphous polyethylene terephthalate, polyethylene, paper, metal foil, and coiled metal.

15. The method of claim 14 in which the heat shrinkable film is chosen from the group consisting of oriented polystyrene, glycol-modified polyethylene terephthalate, and polyvinyl chloride.

16. The method of claim 13 in which the impressing image is chosen from the group consisting of holographic, varying texture images, stereograms, light-diffracting devices, optical lenses, and lenticular surfaces.

17. The method of claim 13 in which the registration location of the master drum is an angle of rotation of the drum corresponding to a pre-determined location on the drum surface.

18. The method of claim 13 in which the registration location of the master drum reference may be a registration mark on the edge of the drum.

19. A method of preparing a carrier web having printed images spaced at a first repeat distance with impressed images in registration with the printed images comprising:
providing a carrier web with printed images spaced at a first repeat distance and corresponding registration marks;

providing a master web with impressing images at a second repeat distance and corresponding registration marks where the second repeat distance is less than the first repeat distance;

applying an energy curable resin coating to the carrier web on the side opposite the printed images;

stretching the master web to align the registration marks of the carrier web and the master web;

nipping the master web to the coated carrier web at a nip location point to thereby impress images on the coated carrier web in registration with the printed images;

applying curing energy; and separating the master from the carrier web to leave an impressed image on the carrier web in registration with the printed images on the carrier web.

* * * * *